US005953539A

United States Patent [19]

Hemmert et al.

[11] Patent Number: 5,953,539

[45] Date of Patent: *Sep. 14, 1999

[54] SERVICE SWITCHING POINT HAVING A DIRECT MEMORY ACCESS CONTROLLER

[75] Inventors: Rudolf Hemmert, Simmelsdorf; Christian Fischer, Nürnberg, both of Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/953,104

[22] Filed: Oct. 17, 1997

Related U.S. Application Data

[63] Continuation of application No. 08/498,134, Jul. 5, 1995, abandoned.

[30] Foreign Application Priority Data

Jul. 5, 1994 [DE] Germany ............................ 44 23 496

[51] Int. Cl.[6] ........................ G06F 13/00

[52] U.S. Cl. ........................ 395/846

[58] Field of Search ........................ 395/841–855, 395/427; 711/100

[56] References Cited

U.S. PATENT DOCUMENTS

| | | | |
|---|---|---|---|
| 5,251,303 | 10/1993 | Fogg, Jr. et al. | 395/275 |
| 5,404,481 | 4/1995 | Miyamori | 395/842 |
| 5,408,615 | 4/1995 | Ishikawa | 395/846 |
| 5,414,815 | 5/1995 | Sehwede | 395/846 |
| 5,454,030 | 9/1995 | De Oliveira et al. | 379/100 |
| 5,465,332 | 11/1995 | Deloye et al. | 395/842 |
| 5,548,786 | 8/1996 | Amini et al. | 395/842 |
| 5,599,350 | 2/1997 | Takagi et al. | 395/842 |
| 5,619,727 | 4/1997 | Chen et al. | 395/842 |

*Primary Examiner*—Christopher B. Shin
*Attorney, Agent, or Firm*—Steven R. Biren

[57] ABSTRACT

A service switching point having a direct memory access controller is used for controlling a data transfer between a data memory and an input/output device. There is proposed to provide the direct memory access controller for generating a first part of an address, and a generator for cyclically generating a second part of the address. Such a service switching point can preferably be used in PCM 30 transmission networks when a subscriber device is coupled to the service switching point via a DSV2 connecting line while 2.048 Mbit/s data rates occur.

4 Claims, 3 Drawing Sheets

SERVICE SWITCHING POINT HAVING A DIRECT MEMORY ACCESS CONTROLLER

This is a continuation of application Ser. No. 08/498,134, filed Jul. 5, 1995 abandoned.

BACKGROUND OF THE INVENTION

1. Field of the Invention

The invention relates to a service switching point having a direct memory access controller used for controlling a data transfer between a data memory and an input/output device.

2. Discussion of the Related Art

Such a service switching point is used, for example, for processing digital data streams of PCM30 systems. When a subscriber device is connected to the service switching point via a so-termed DSV2 connecting line, 2.048 Mbit/s data rates occur. The data streams are subdivided into successive frames, which have each thirty-two time slots consecutively numbered from 0 to 31. Each time slot contains eight bits. The time slots 1 to 15 and 17 to 31 then correspond each to a speech channel. A time slot 0 carries message and synchronization bits. The time slots 16 carry each eight data bits for a signalling channel which is used for transmitting switching information (signalling information). The eight bits of each time slot 16 contain the switching information for two speech channels. The time slots 16 of sixteen successive frames carry the switching information for all 30 speech channels to be switched (IKZ50 signalling).

In order to make it possible to switch an arriving or outgoing 2.048 Mbit/s data stream, the data bits of the signalling channel (time slot 16) of at least 16 successive frames are to be buffered in a data memory. The data memory has a predeterminable storage area for both the incoming and outgoing data streams. An incoming data stream is received by the input device from where the data bits of the signalling channel are transferred to the data memory on a data bus. Furthermore, signalling data stored in the data memory and meant for the outgoing data stream are transferred to the output device on the data bus.

It is known to use a direct memory access controller DMA for controlling the data transfer between an input/output device and a data memory, so as not to burden a processor with this task. The processor can perform other process-internal functions during the data transfer. From U.S. Pat. No. 5,251,303 is known the connection of a direct memory access controller (DMA) for controlling a data transfer between input/output devices and a data memory in digital computers. The direct memory access controller is then used for generating addresses (pointers) for addressing each storage area of the data memory in which the data to be transferred are written or from which they are read.

Before the beginning of a data transfer, the direct memory access controller is to be initialized. On initialization, one address register for a source address and one address register for a target address are put on a start address for each channel of the direct memory access controller, while for each direction of data transfer one channel is provided. The source address addresses the data source, the destination address addresses the data sink. Furthermore, on initialization of the direct memory access controller, the number of data bytes is determined which are to be transferred during one data communication cycle. When a data byte is transferred, a counter of the direct memory access controller is incremented or decremented. If the number of increments or decrements (and thus the respective count) correspond to the number of data bytes to be transferred, predefined at the initialization, a renewed initialization of the direct memory access controller is needed for a further data transfer.

In a service switching point for processing data streams at a data rate of 2.048 Mbit/s, as described above, the successive time slots 16 of the signalling channel have each a 125 $\mu$s distance i.e. an initialization of the direct memory access controller is to take place within 125 $\mu$s after the last memory cell of the memory area of the data memory has been written/read, in which the data or signalling bits respectively, of the time slot 16 of the incoming or outgoing data stream respectively, are buffered. The initialization of the direct memory access controller is effected with the aid of a processor whose main task is processing the signalling data stored in the data memory. In the case of high data rates, the processor is to effect the initializations of the direct memory access controller in such short distances in time that there is not enough time available for its other tasks, especially, the processing of the signalling data.

SUMMARY OF THE INVENTION

Therefore, it is an object of the invention to make data transfer even at high data rates possible in a simple manner in the service switching point of the type defined in the opening paragraph by the direct memory access controller.

The object is achieved in that the direct memory access controller is provided for generating a first part of an address and in that a generator is provided for cyclically generating a second part of the address.

The first part of the address generated by the direct memory access controller determines the relative position of the memory area to be addressed inside the data memory. The second part of the address is used for determining the individual memory cells of the memory area to be addressed, which memory area need not necessarily be adjacent. By generating the second part of the address, the generator acting as a counter replaces the counting function of the direct memory access controller. Since the generator cyclically generates the second part of the address, i.e. automatically changes to its initial state after all the addresses of the memory area have been addressed, a cyclic initialization of the direct memory access controller can be omitted. An initialization is then needed only once.

An embodiment of the invention comprises a switching device that depends on the status of the direct memory access controller, which device is provided for coupling during a first switching state a certain number of address lines, which are used for supplying address bits to the data memory, to a corresponding number of address outputs of a control unit which includes a processor and, during a second switching state, for coupling these address lines to a corresponding number of generator outputs to generate the second part of the address.

During the first switching state of the switching device, in which the direct memory access controller has the status of being "inactive", the processor can access the address bus by the address lines and perform control functions, for example. During the second switching state, the direct memory access controller has the "active" status. The controller is used now for controlling a data transfer between the input/output device and the data memory. With this status, the processor is not loaded by control functions for this data transfer and can meanwhile perform, for example, calculations, without accessing the address bus or data bus. The switching device operating as a ganged switch can easily be realised. It may be arranged, for example, as an integrated circuit on a chip.

In another embodiment of the invention a certain number of generator outputs producing address bits are coupled to one address line each during the data transfer between the data memory and the input/output device in the first of the two directions of data transfer. In the second direction of data transfer at least one of these generator outputs is not coupled to an address line.

In this manner, differently sized memory areas of the data memory i.e. having a different number of memory cells can be addressed for the two directions of data transfer. If, for example, in the first direction of data transfer one generator output more is coupled to an address line than in the second direction of data transfer, twice as many memory cells can be addressed for the first direction of data transfer than for the second direction of data transfer. This can easily be realised in that one of the separate switches of the switching device arranged as a ganged switch is driven in dependence on the direction of data transfer, irrespective of the other separate switches of the switching device, and thus couples one of the generator outputs in the first direction of data transfer to an address line. In the second direction of data transfer this generator output is not coupled to an address line, which corresponds to a third switching state of the switching device. For each direction of data transfer there is especially provided an autonomous channel of the direct memory access controller. The first address part to be generated by the direct memory access controller contains in this case a different number of address bits for each channel, which address bits are fixed for each direction of data transfer.

The invention likewise relates to a circuit arrangement comprising a direct memory access controller (DMA) which is used for controlling a data transfer between a data memory and another function unit. The circuit arrangement is characterized in that the direct memory access controller (DMA) is provided for generating a first part of an address and in that a generator is provided for cyclically generating the second part of the address.

The invention is not restricted to switching devices. It can generally be used for the data transfer via a direct memory access controller when there is not enough time available for initializing the controller. The data transfer may then be effected between the data memory and an input/output device, but also, for example, between two data memories.

These and other aspects of the invention will be apparent from and elucidated with reference to the embodiments described hereinafter.

DETAILED DESCRIPTION OF THE PREFERRED EMBODIMENTS

Figure 1:
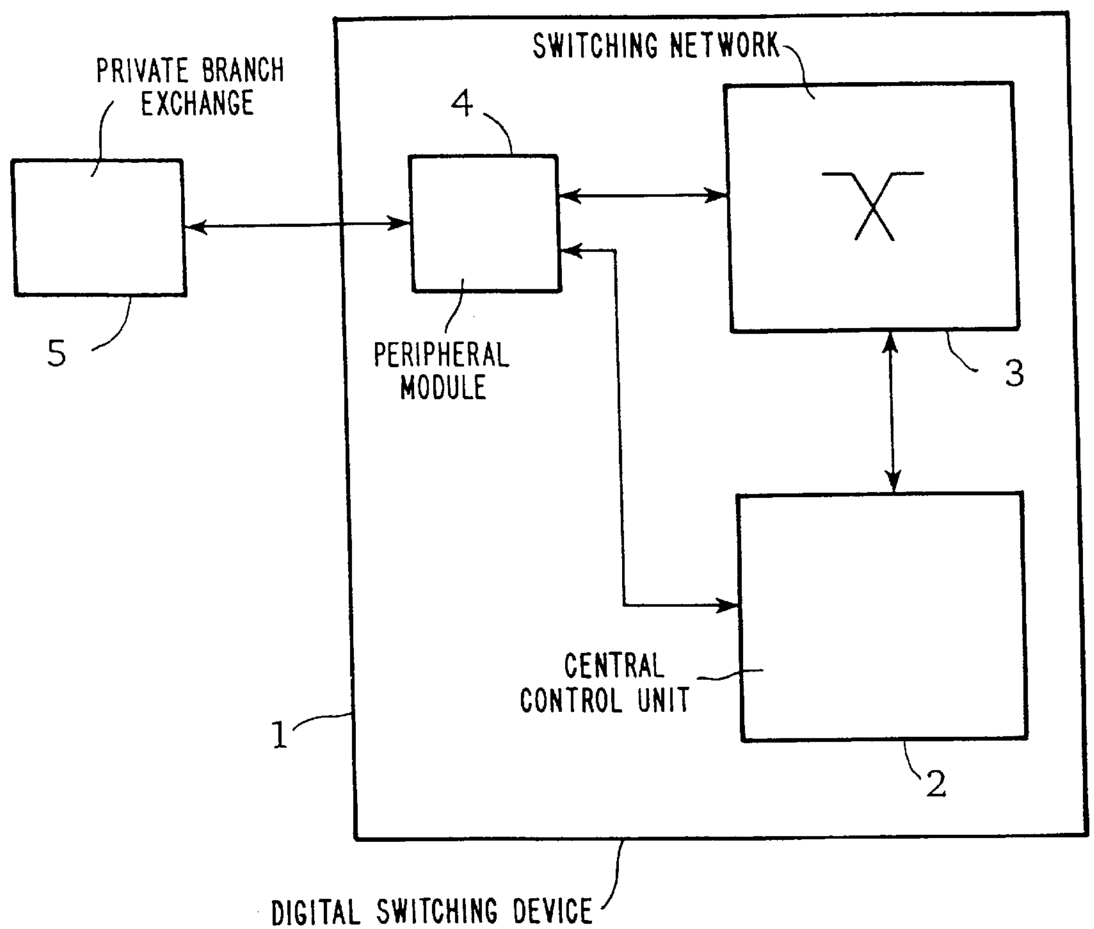
FIG. 1 shows a switching device.

FIG. 1 shows a digital switching device 1 provided to be connected in a PCM30 data transmission network. It comprises a central control unit 2, a switching network 3 and a peripheral module 4. The central control unit 2 is used for controlling and monitoring all function units of the switching device 1. The peripheral module 4 is coupled to a private branch exchange 5 via a DSV2 connecting line, whereas also different exchanges can be connected in lieu of the private branch exchange. Data are transferred between the peripheral module 4 and the private branch exchange 5 at a data rate of 2.048 Mbit/s in the two directions of data transfer. Via further peripheral modules (not shown) it is possible to couple further private branch exchanges, subscriber terminals, but also a trunk exchange to the service switching point 1. The service switching point 1 shown is used in the present case as a local switching centre.

Figure 2:
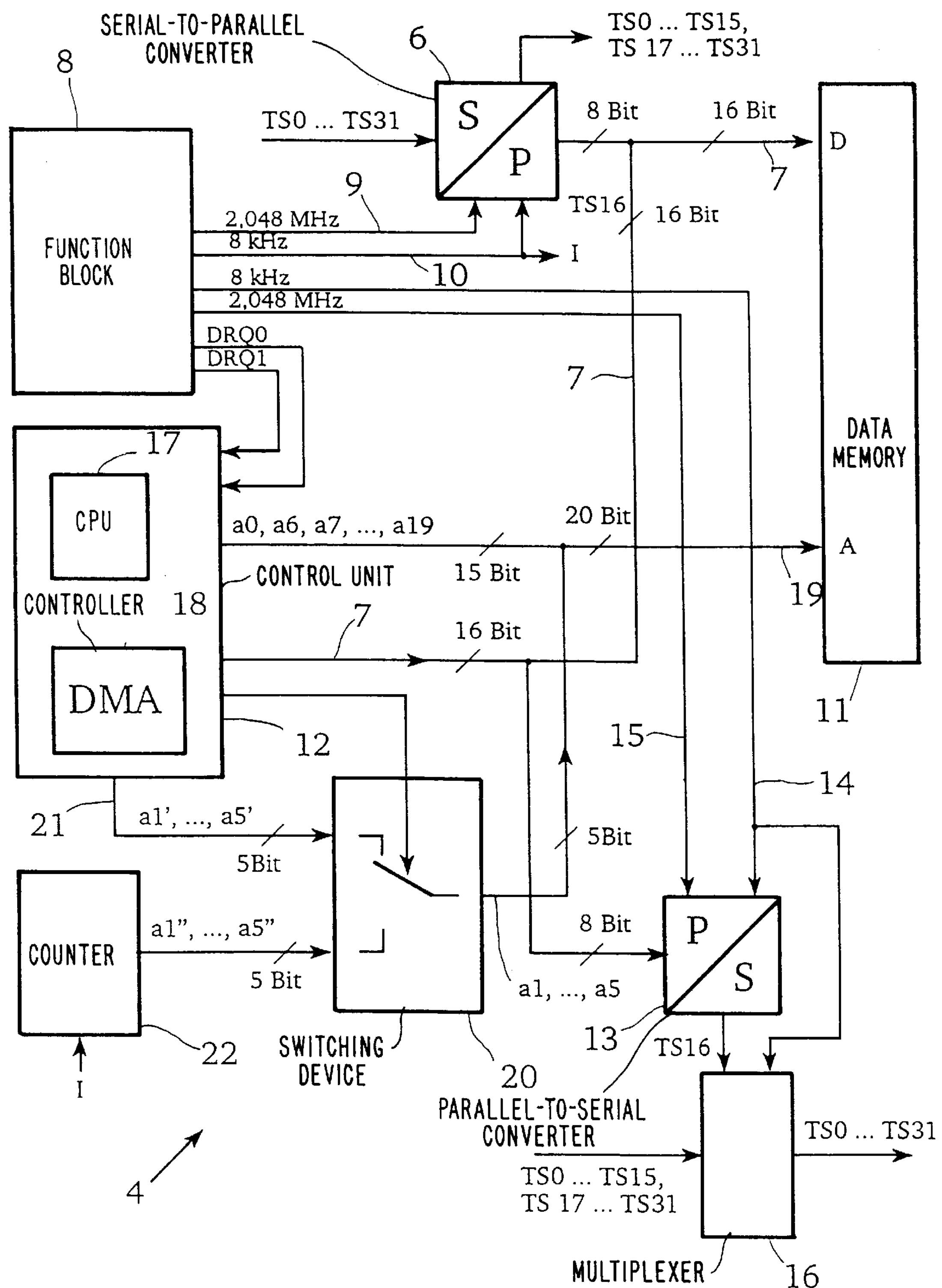
FIG. 2 shows a peripheral module of the switching device shown in FIG. 1.
Figure 3:
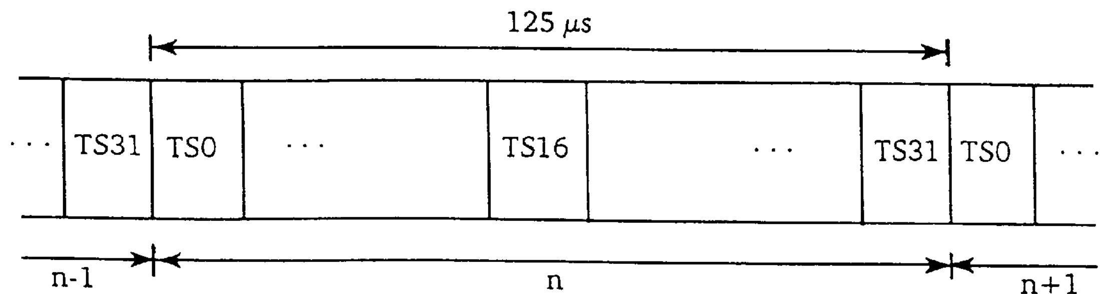
FIG. 3 shows the frame structure of a data stream to be processed.

FIG. 2 shows the basic structure of the peripheral module 4. It comprises as an input unit a serial-to-parallel converter 6 by which a serial data stream is received at a data rate of 2.048 Mbit/s. The data stream is subdivided into successive frames which are formed each by thirty-two time slots TSO to TS31. The frame structure of such a data stream is shown in FIG. 3. There is shown a frame n, the end of a preceding frame n−1 and the beginning of a next frame n+1. The time slots TS0 to TS31 of each frame contain eight data bits each i.e. one data byte. In each frame one time slot is assigned to a communication channel. The time slots TS1 to TS15 and the time slots TS17 to TS31 contain the data bits for thirty speech channels. The time slot TS0 contains message and synchronization bits, respectively. The time slot TS16 is assigned to a signalling channel by which the digital switching information bits are transmitted. A frame having thirty-two time slots lasts 125 $\mu$s, so that from two adjacent frames two time slots belonging to the same channel (for example, two adjacent time slots TS16) are 125 $\mu$s apart.

On the output side of the serial-to-parallel converter 6 is coupled to eight data lines of a bidirectional data bus 7, which bus has a total of sixteen data lines. The number of lines of a bus is denoted in FIG. 2 by the number of parallel-transferred bits (16 bits on data bus 7). A function block 8 supplies the serial-to-parallel converter 6 via a control line 9 with a clock signal having a frequency of 2.048 MHz for the synchronization with the individual data bits of the incoming data stream, and via control line 10 with a clock signal having the frequency of 8 kHz (the reciprocal value of 125 $\mu$s) for the synchronization with the time slot TS16 of the incoming data stream.

To the data bus 7 are further connected a data memory (RAM) 11 and a control unit 12. The eight data lines of data bus 7 which are coupled to the serial-to-parallel converter 6 are furthermore coupled to a parallel-to-serial converter 13. This parallel-to-serial converter 13 is supplied via two control lines 14 and 15 with two clock signals having the frequencies of 8 kHz and 2.048 MHz which are used for the synchronization with the time slot TS16, or the individual data bits of the outgoing data stream, respectively. The output of the parallel-to-serial converter 13 is coupled to a multiplexer 16 which is supplied with the 8 kHz clock signal via the control line 14, and which inserts the data bits of the time slot TS16 into the outgoing data stream formed by the time slots TS0 to TS31.

The control unit 12 is in the present case a 80C186 microcontroller manufactured by Intel (called microprocessor by Intel). In this microcontroller, data words consisting of 16 bits are addressed by 20-bit addresses. The control unit 12 has also a direct memory access controller (DMA) 18 in addition to a processor (CPU) 17. Function block 8 supplies a control signal DRQO and a control signal DRQ1 to the control unit 12. The direct memory access controller 18 is activated in response to these control signals. The control signal DRQ0 controls a first channel of the direct memory access controller 18 and the control signal DRQ1 controls a second channel of the direct memory access controller 18. Both channels operate independently.

The data memory 11 is supplied with addresses by an address bus which is provided for transferring 20-bit addresses and thus has twenty address lines. Fifteen of the twenty address outputs of control unit 12, which present the address bits a0, a6, a7, . . . , a19 (first part of an address), are coupled to fifteen corresponding address lines of the address bus 19. The least significant bit is then a0 and the most significant bit is a19. The remaining five address lines of the address bus 19 are coupled to five outputs of a switching device 20 which is arranged as a ganged switch consisting of five separate switches. This ganged switch is controlled by the control unit 12 in three different switching states still to be explained.

In a first switching state of the switching device 20 the direct memory access controller 18 is inactive and the processor 17 is used for supplying all twenty address bits a0 to a19 of an address. Five address outputs 21 of the control unit 12, which supply the five address bits a1', . . . , a5', are switched to five address lines of the address bus 19 by the switching device 20. Then holds:

a1=a1', a2=a2', . . . , a5=a5'.

In a second switching state of the switching device 20, the five outputs of a 5-bit dual counter 22 (generator), which are used for producing five counter bits a1", . . . , a5", are switched to the five outputs of the switching device 20 and thus to the corresponding address lines of the address bus 19. The counter 22 is synchronized with the time slot TS16 of the incoming data stream via the clock signal produced by function block 8 and having an 8 kHz frequency on the control line 10, so that for each incoming time slot TS16 the count is incremented in the data memory 11 (first direction of data transfer) once the eight signalling bits have been transferred. The address bits a1, . . . , a5 (second part of the address) are in this switching state equal to the bits a1", . . . , a5" produced by the counter 22. Then holds:

a1=a1", a2=a2", . . . , a5=a5"

In this switching state, the first channel of the direct memory access controller 18 is active and this channel controls the transfer of the data bits of time slot TS16 of the incoming data stream that comes from the serial-to-parallel converter 6 (input unit) to a first memory area of the data memory 11, while the direct memory access controller indicates via a write signal applied to a write/read control line of a control bus (not shown), that a destination address is available on the address bus (which destination address addresses the first memory area of the data memory 11). In that case the processor 17 does not supply data or address bits to the data or address outputs of the control unit 12. The address bits a0, a6, a7, . . . , a19 are generated by the first channel of the active direct memory access controller 18. These address bits are constant. They are defined during the once-only initialization of the direct memory access controller 18, in that the destination address of the first channel is initialized. During the initialization, also the source address for the first channel of the direct memory access controller, thus the unchanging address of the serial-to-parallel converter 6, is defined.

For the case where the second channel of the direct memory access controller 18 is active, the switching device 20 is sent to a third switching state and data bits are transferred for the time slot TS16 of an outgoing data stream from a second memory area of the data memory 11 to the parallel-to-serial converter 13, while the direct memory access controller applies a read signal to the write/read control line of the control bus (not shown) denoting that a source address (addressing the second memory area of the data memory 11) is available on the address bus. A second memory area now has only half as many memory cells as the first memory area. In this switching state no more than four of the five outputs of the counter 22 create an actual communications path to the corresponding address lines of the address bus 19 via the switching device 20. Thus, for the first four address bits supplied by the switching device 20 there holds:

a1=a1", . . . , a4=a4".

The fifth address bit a5 produced by the switching device 20 is not produced by the counter 22, but by the address output of control unit 12, which produces address bit a5', and is thus produced by the second channel of the direct memory access controller 18. There holds:

a5=a5'.

The address bits a0, a6, a7, . . . , a19 are, similar to the second switching state, also generated by the second channel of the direct memory access controller 18. They are defined together with the address bit as when the second channel of the direct memory access controller 18 is initialized in that the source address is initialized, and are also constant. When the second channel is initialized, the destination address for the second channel of the direct memory access controller 18, thus the unchanging address of the parallel-to-serial converter 13, is additionally defined.

In accordance with the three switching states of the switching device 20 described above, three enabled states of the peripheral module 4 of the switching device 1 will be distinguished in the following. In the first enabled state, in which the switching device 20 adopts the first switching state, the direct memory access controller 18 is inactive. The processor 17 is then used for supplying address bits a0, a1, . . . , a19 to the address bus 19. Furthermore, data are transferred or received by the processor 17 via the data bus 7. In the second or third enabled state, which corresponds to the second or third switching state of the switching device 20, the direct memory access controller 18 is active. The controller 18 is used for either writing data bits of the cyclically occurring time slot TS16 received from the serial-to-parallel converter 6 in a first memory area of the data memory 11 (first direction of data transfer), or reading data bits from a second memory area of the data memory 11 and inserting these data bits, via the parallel-to-serial converter 13 and the multiplexer 16 which are used together as one output unit, in the time slot TS16 of an outgoing data stream produced by the multiplexer 16 (second direction of data transfer). The writing of data bits of a time slot TS16 in the data memory 11 is controlled by the first channel of the direct memory access controller 18. The reading of data from the second memory area for outgoing time slot TS16 is effected by the second channel of the direct memory access controller 18. The direct memory access controller 18 is thus used for transferring data from the serial-to-parallel converter 6, operating as an input unit, to the data memory 11, and for transferring data from the data memory 11 to an output unit which in the present case is formed by the parallel-to-serial converter 13 and the multiplexer 16.

The parallel-to-serial converter 13 produces from the data bits supplied in parallel by eight data lines of the data bus 7 to the parallel-to-serial converter 13 and read from the second memory area of a data memory 11, serial data bits which are inserted by the multiplexer 16 in the time slot TS16 of the outgoing data stream. The data bits of the remaining time slots TS0 to TS15 and TS17 to TS21 are supplied to the multiplexer 16 of the switching network 3.

Figure 4A:
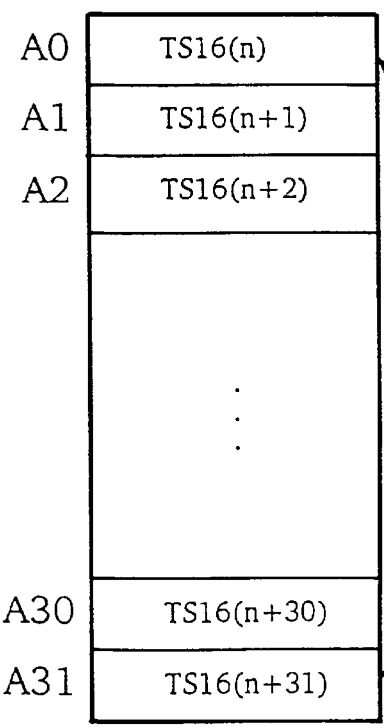
FIGS. 4A and 4B show two memory areas for the signalling data of an incoming or outgoing data stream.
Figure 4B:
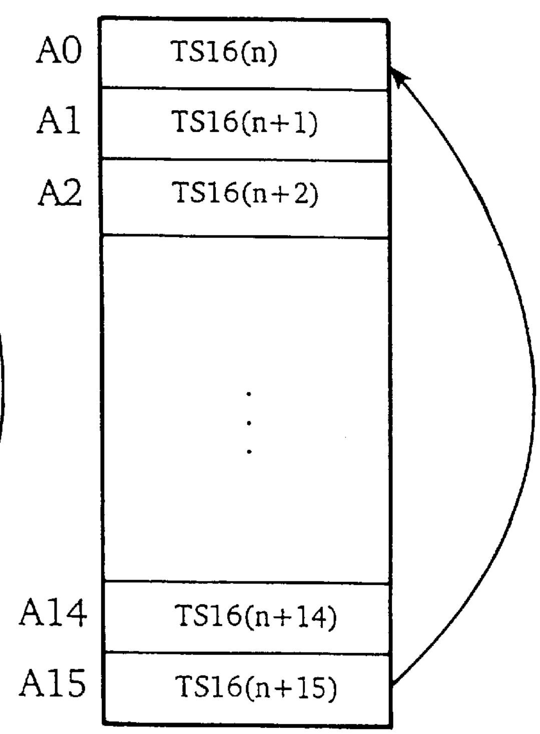

FIGS. 4A and 4B show the first and second memory areas of the data memory 11. The addressable memory cells can store data words consisting of sixteen bits. As a time slot TS16 contains only eight bits in the present illustrative embodiment, only half the locations of the memory cells are written. The remaining eight locations remain empty, but may be used for test purposes or possibly for a further 2.048 Mbit/s data stream. The fact that only half the number of locations of the memory cells of the first and second memory areas of the data memory 11 are used can be noticed in FIG. 2 in that, on the one hand, the output of the serial-to-parallel converter 6 and, on the other hand, the input of the parallel-to-serial converter 13 are coupled to only eight data lines of the data bus 7.

The first memory area of the data memory 11 as shown in FIG. 4A contains thirty-two memory cells addressed by addresses a0, a1, . . . , a31. The 20-bit addresses a0 to a31 are generated in the following manner when the first channel of the direct memory access controller is accessed, or signalling bits of the time slot TS16 are transferred from the serial-to-parallel converter 6 to the data memory 1: the fixed address bits a0, a6, a7, . . . , a19 (first part of an address) are generated by the direct memory access controller 18 and define the relative position of the first memory area in the data memory 11. The address bits al to as (second part of the address) are the counter bits a1" to a5" available on the outputs of the counter. For the address a0, all the counter output bits a1" to a5" are zero. For a pulse of the 8 kHz clock signal generated by the function block 8, which clock signal is available on the control line 10 and is applied to a counter control input, the counter 22 increments its count, so that all the counter output bits a1" to a5" are equal to 1 at the address A31. At the next clock pulse, the counter output bits a1" to a5" are automatically reset to 0, so that again the address a0 is available on the address bus. The counter 22 is synchronized with the time slot TS16 of the incoming data stream via the 8 kHz clock signal. The counter 22 cyclically generates the address bits al to as and takes over the counting function of the first channel of the direct memory access controller 18 which is then only to be initialized before the beginning of a data stream to be processed. The number of data bytes to be transferred during a communication cycle of the first channel is then set to "one". A return from the address a31 to the address a0 is to take place in the present case within 125 μs at the most i.e. within the period of time lying between two successive time slots TS16. A return via a re-initialization of the direct memory access controller 18 in this very brief period of time would cause the processor 17, with whose help the re-initialization could be effected, not to have enough time for performing its original tasks (especially the processing of the signalling data) during these 125 μs.

The first memory area is provided for storing the data bits of thirty-two successive time slots TS16, so that, while data are being stored in the memory cells that have the addresses AO to A15, the data bits of the memory cells that have the addresses A16 to A31 are available for further processing. While data are stored in the memory cells at the addresses A16 to A31, the data bits of the memory cells that have the addresses A0 to A15 are then available for further processing.

In the second memory area shown in FIG. 4B, from which the data bits for the time slots TS16 of the outgoing data stream are read out (second direction of data transfer) it is sufficient to have sixteen memory cells, because these data bits are inserted in the outgoing data stream directly, without further processing. For addressing the 16 memory cells, the counter bit a5" (the most significant counter bit) is not generated by counter 22, but is set to a constant value by the direct memory access controller 18 (second channel), just like the remaining address bits a0, a6, a7, . . . , a19.

The memory cells a0 to a31 or a0 to a15 from FIGS. 4A and 4B are addressed with only even addresses, because a memory cell consists of two bytes i.e. sixteen bits in all. For this reason, the least significant bit a0 is not generated by the counter 22 in case the direct memory access controller 18 accesses one of the two channels, but is fixedly set to zero by the direct memory access controller 18.

We claim:

1. A service switching point comprising a direct memory access controller used for controlling a signaling data transfer between a data memory and an input/output device, wherein said direct memory access controller is provided for generating a first part of an address during an initialization procedure, after which said first part remains constant, and wherein a generator is provided for independently of the controller cyclically generating a second part of the address, said generator being synchronized with a time slot of an incoming data stream.

2. The service switching point as claimed in claim 1, further comprising a switching device downstream of the generation that depends on a status of the direct memory access controller, which is provided for coupling, during a first switching state, a certain number of address lines, which are used for supplying address bits to the data memory, to a corresponding number of address outputs of a control unit which includes a processor and, during a second switching state, for coupling these address lines to a corresponding number of generator outputs to generate the second part of the address.

3. The Service switching point as claimed in claim 1 wherein a certain number of generator outputs producing address bits are coupled to one address line each during the data transfer between the data memory and the input/output device in the first of the two directions of data transfer, and wherein in the second direction of data transfer at least one of these generator outputs is not coupled to an address line.

4. A circuit arrangement comprising a direct memory access controller used for controlling a signaling data transfer between a data memory and another function unit, wherein said direct memory access controller is provided for generating a first part of an address during an initialization procedure, after which said first part remains constant, and wherein a generator is provided for independently of the controller cyclically generating a second part of the address, said generator being synchronized with a time slot of an incoming data stream.

* * * * *